(12) United States Patent
Gates et al.

(10) Patent No.: US 7,730,459 B2
(45) Date of Patent: Jun. 1, 2010

(54) GENERATING EXECUTABLE CODE BASED ON CODE PERFORMANCE DATA

(75) Inventors: Frank G. Gates, Chandler, AZ (US); James L. Jason, Hillsboro, OR (US); Erik J. Johnson, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1204 days.

(21) Appl. No.: 10/676,311

(22) Filed: Sep. 30, 2003

(65) Prior Publication Data

US 2005/0071834 A1 Mar. 31, 2005

(51) Int. Cl.
*G06F 9/44* (2006.01)
(52) U.S. Cl. .................. 717/131; 717/152; 717/153; 717/154
(58) Field of Classification Search ......... 717/131–161, 717/124–135
See application file for complete search history.

(56) References Cited

U.S. PATENT DOCUMENTS

| | | | | |
|---|---|---|---|---|
| 5,187,789 | A * | 2/1993 | O'Hair | 707/4 |
| 5,659,754 | A * | 8/1997 | Grove et al. | 717/158 |
| 6,275,981 | B1 * | 8/2001 | Buzbee et al. | 717/158 |
| 6,289,505 | B1 * | 9/2001 | Goebel | 717/153 |
| 6,874,140 | B1 * | 3/2005 | Shupak | 717/131 |
| 7,000,227 | B1 * | 2/2006 | Henry | 717/152 |
| 2003/0051234 | A1 * | 3/2003 | Schmidt | 717/158 |
| 2003/0154469 | A1 * | 8/2003 | Anderson et al. | 717/161 |
| 2003/0167458 | A1 * | 9/2003 | Santhanam et al. | 717/114 |
| 2004/0073899 | A1 * | 4/2004 | Luk et al. | 717/158 |
| 2004/0199904 | A1 * | 10/2004 | Schmidt | 717/130 |

OTHER PUBLICATIONS

Mantripragada et al., Selective guarded execution using profiling on a dynamically scheduled processor, IEEE, Dec. 2000 pp. 15-22.*
Zilles et al., A programmable co-processor for profiling, IEEE, 2001 pp. 241-252.*
Berndl et al., Dynamic profiling and trace cache generation, IEEE, Mar. 2003 pp. 276-285.*

\* cited by examiner

*Primary Examiner*—Wei Y Zhen
*Assistant Examiner*—Satish Rampuria
(74) *Attorney, Agent, or Firm*—Blakely, Sokoloff, Taylor & Zafman LLP (57) ABSTRACT

A compiler transforms source code into intermediate code and provides the intermediate code to a profiler. The profiler executes the intermediate code. The profiler generates a performance profile that indicates the performance of the intermediate code, and annotates the intermediate code based, at least in part, on data from the performance profile. The compiler receives annotated intermediate code from the profiler and transforms the annotated intermediate code into machine code. Alternatively, the compiler transforms intermediate code to machine code and provides the machine code to a profiler. The profiler executes the machine code and generates a data file that indicates the performance of the machine code. The compiler receives the data file, and modifies the machine code based on the data file.

12 Claims, 6 Drawing Sheets

GENERATING EXECUTABLE CODE BASED ON CODE PERFORMANCE DATA

TECHNICAL FIELD

Embodiments of the invention are generally related to the field of compilers and, in particular, to generating executable code.

BACKGROUND

In general, a program is sequences of instructions executed by a processor to cause an electronic system to perform various functions. An electronic system may be, for example, a desktop, laptop or palmtop computer, or an electronic device such as a personal digital assistant (PDA), cellular phone or network access device. Typically, a programmer writes the program in a programming language, at which point the program is generally referred to as source code. The programmer runs a compiler to transform the source code into machine code, converting the program into a form that a processor can execute.

A compiler is a program that transforms source code into machine code. A front-end of the compiler receives the source code and generates an intermediate representation of the source code. The intermediate representation is also referred to herein as intermediate code. A back-end of the compiler uses the intermediate code to generate machine code.

A program may contain sections, commonly referred to as hotspots, that take more time to execute than other sections of the program, and thus negatively affect the program's performance. An example of a hotspot is a section of code at which a large number of incorrect branch predictions occur. A branch instruction is a point in a program at which a processor executes one set of instructions under one condition, and another set of instructions under another condition. Typically, the processor evaluates the branch before processing may continue, which thus slows processing. Some processors use a technique, commonly referred to as predictive branching, to predict, prior to the processor arriving at the branch instruction, which branch is the correct branch.

Instructions for a predicted branch are loaded in a pipeline prior to the processor arriving at the branch instruction. In general, a pipeline is used to load one instruction while a processor is executing another instruction. Without a pipeline, the processor retrieves, or fetches, an instruction from memory, executes the instruction, retrieves the next instruction, executes it, etc. Accordingly, the processor cannot execute an instruction until it is fetched. With a pipeline, instructions to be executed following an instruction currently being executed are fetched and held in a buffer while the processor is executing the current instruction. The buffer is typically closer to the processor than the memory in which the instructions are initially stored, which allows the processor to execute the program faster.

If instructions for a predicted branch are stored in a pipeline, but the predicted branch turns out to be the incorrect branch, the pipeline is flushed, i.e., instructions corresponding to the incorrect branch are cleared and replaced with instructions corresponding to the correct branch. Flushing a pipeline is expensive in terms of time, since the next and subsequent instructions must be loaded into the pipeline and proceed through the pipeline to be executed, before further progress in executing the program may be achieved. Consequently, flushing the pipeline causes a program to execute more slowly. Thus, a section of a program at which a large number of incorrect branch predictions and pipeline flushes occur typically cause a hotspot in the program.

A programmer can run a program and use a conventional tool commonly known as a profiler to analyze the program's performance and identify hotspots. In general, a profiler is a program that periodically collects and records samples of another program at user-defined time intervals while the program is running. The profiler records information regarding each section of the program sampled over a period of time, where such information includes, for example, the amount of time a section of the program takes to execute.

A programmer can use the information generated by the profiler to determine hotspots in a program. The programmer may choose to improve the program by manually inspecting and rewriting sections of the program that correspond to the hotspots. However, a profiler is unable to identify all of the hotspots in a single run of the program. Thus, if the programmer wants to further improve the code, the programmer runs the compiler to convert the revised source code into machine code, runs the revised program and uses the profiler to determine hotspots in the revised program. Accordingly, improvement in the program is limited to the hotspots identified each time the program is run. Improving the program using a conventional compiler and profiler therefore consumes a great deal of time and resources.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

A method for improving compiler-generated executable code is described. In the following description, for purposes of explanation, numerous specific details are set forth. It will be apparent, however, to one skilled in the art that embodiments of the invention can be practiced without these specific details. In other instances, structures and devices are shown in block diagram form in order to avoid obscuring the understanding of this description.

Figure 1:
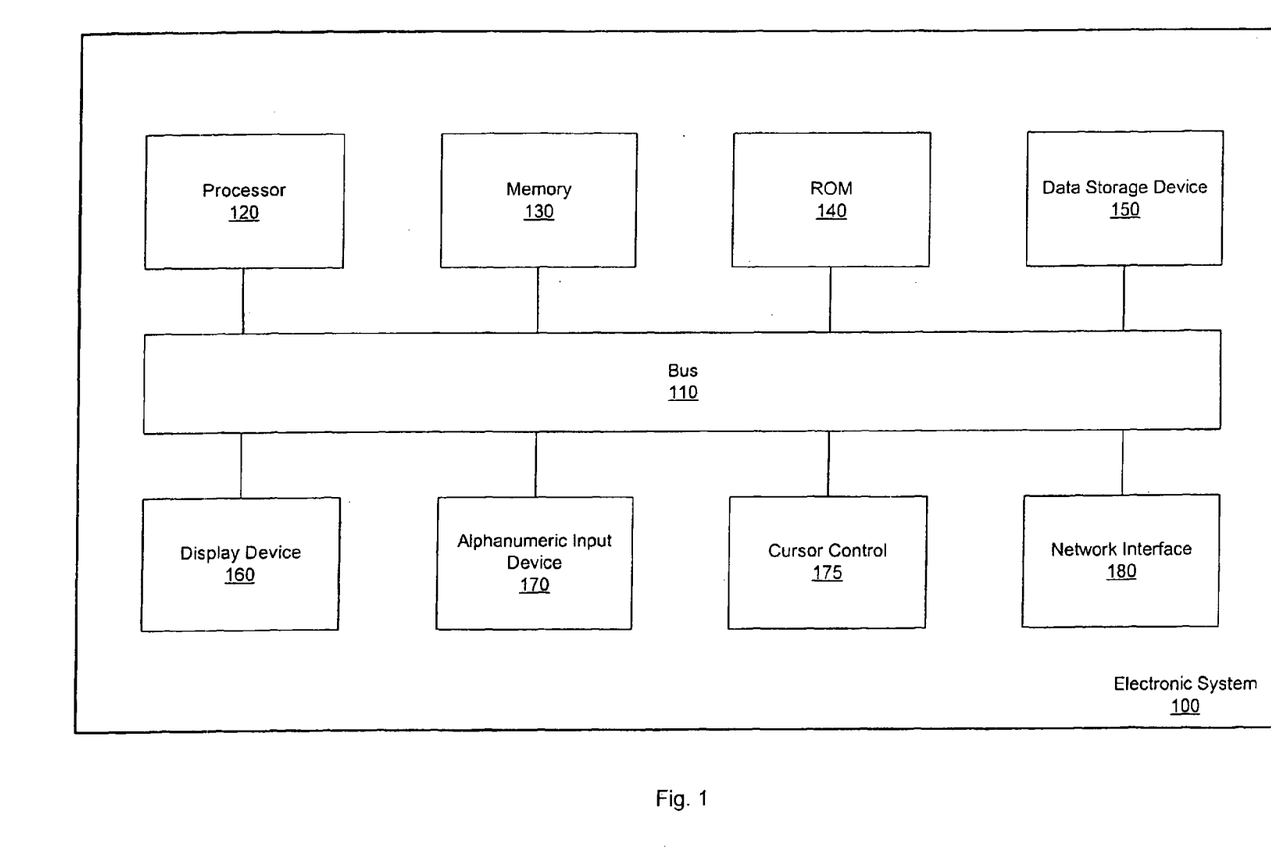
FIG. 1 is a block diagram illustrating an embodiment of an electronic system.

FIG. 1 is a block diagram of one embodiment of an electronic system. In one embodiment, the technique described herein can be implemented as sequences of instructions executed by an electronic system. The electronic system is intended to represent a range of electronic systems, including, for example, a personal computer, a personal digital assistant (PDA), a laptop or palmtop computer, a cellular phone, a computer system, a network access device, etc. Other electronic systems can include more, fewer and/or different components. The electronic system can be coupled to a wired network, e.g., via a cable such as a coaxial cable or twistedpair cable, a wireless network, e.g., via radio or satellite signals, or a combination thereof. The sequences of instructions can be stored by the electronic system. In addition, the instructions can be received by the electronic system (e.g., via a network connection).

Figure 6:
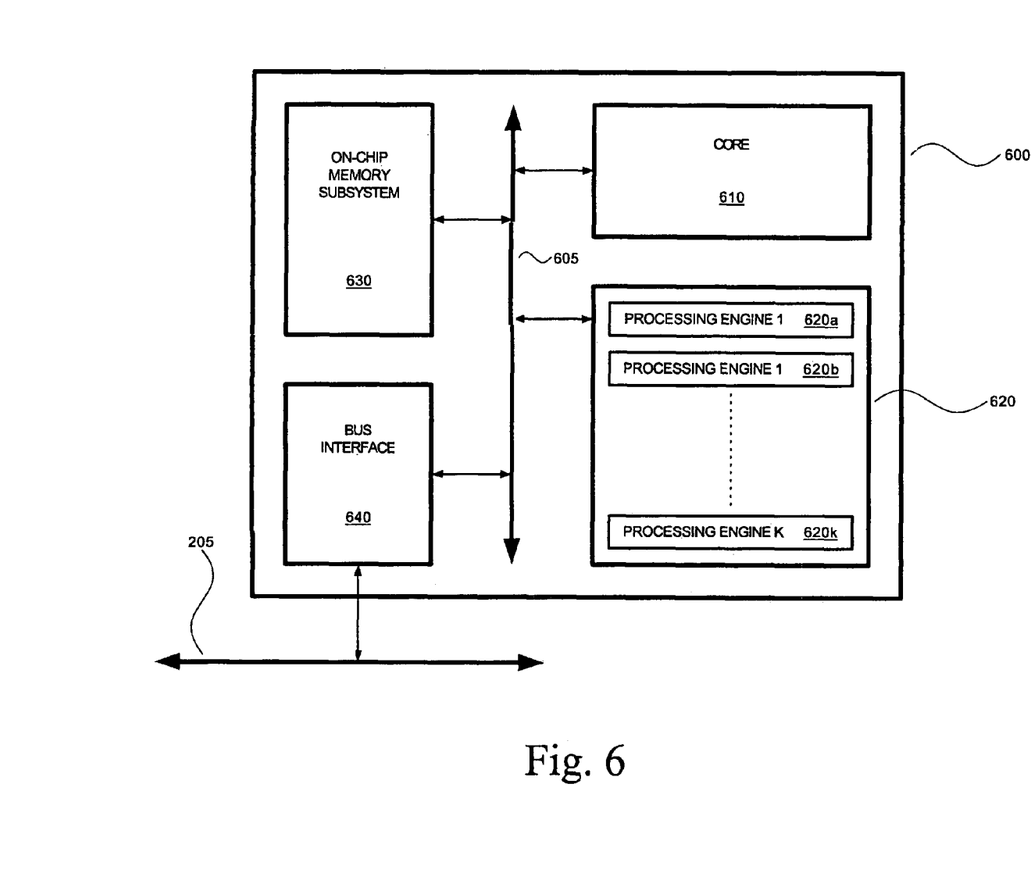
FIG. 6 is a block diagram illustrating an example of a processing device.

Electronic system 100 includes a bus 110 or other communication device to communicate information, and processor 120 coupled to bus 110 to process information. While electronic system 100 is illustrated with a single processor, electronic system 100 can include multiple processors and/or co-processors. Processor 120 may be any suitable processing device or system, including a microprocessor, a network processor, an application specific integrated circuit (ASIC), a field programmable gate array (FPGA), or any other type of processor/integrated circuit. An embodiment of processing device 120 is illustrated below in FIG. 6 and the accompanying text. It should be understood, however, that processing device 120 shown in FIG. 6 is but one embodiment of a processing device. Those of ordinary skill in the art will appreciate that the disclosed embodiments of the invention may be used with many other types of processing systems and/or processor architectures.

Electronic system 100 further includes random access memory (RAM) or other dynamic storage device 130 (referred to as memory), coupled to bus 110 to store information and instructions to be executed by processor 120. Memory 130 also can be used to store temporary variables or other intermediate information while processor 120 is executing instructions. Electronic system 100 also includes read-only memory (ROM) and/or other static storage device 140 coupled to bus 110 to store static information and instructions for processor 120. In addition, data storage device 150 is coupled to bus 110 to store information and instructions. Data storage device 150 may comprise a magnetic disk (e.g., a hard disk) or optical disc (e.g., a CD-ROM) and corresponding drive.

Electronic system 100 may further comprise a display device 160, such as a cathode ray tube (CRT) or liquid crystal display (LCD), to display information to a user. Alphanumeric input device 170, including alphanumeric and other keys, is typically coupled to bus 110 to communicate information and command selections to processor 120. Another type of user input device is cursor control 175, such as a mouse, a trackball, or cursor direction keys to communicate direction information and command selections to processor 120 and to control cursor movement on flat-panel display device 160. Electronic system 100 further includes network interface 180 to provide access to a network, such as a local area network or wide area network.

Instructions are provided to memory from a machine-accessible medium, or an external storage device accessible via a remote connection (e.g., over a network via network interface 180) providing access to one or more electronically-accessible media, etc. A machine-accessible medium includes any mechanism that provides (i.e., stores and/or transmits) information in a form readable by a machine (e.g., a computer). For example, a machine-accessible medium includes random-access memory (RAM), such as static RAM (SRAM) or dynamic RAM (DRAM); ROM; magnetic or optical storage medium; flash memory devices; etc.

In alternative embodiments, hard-wired circuitry can be used in place of or in combination with software instructions to implement the embodiments of the invention. Thus, the embodiments of the invention are not limited to any specific combination of hardware circuitry and software instructions.

Figure 2:
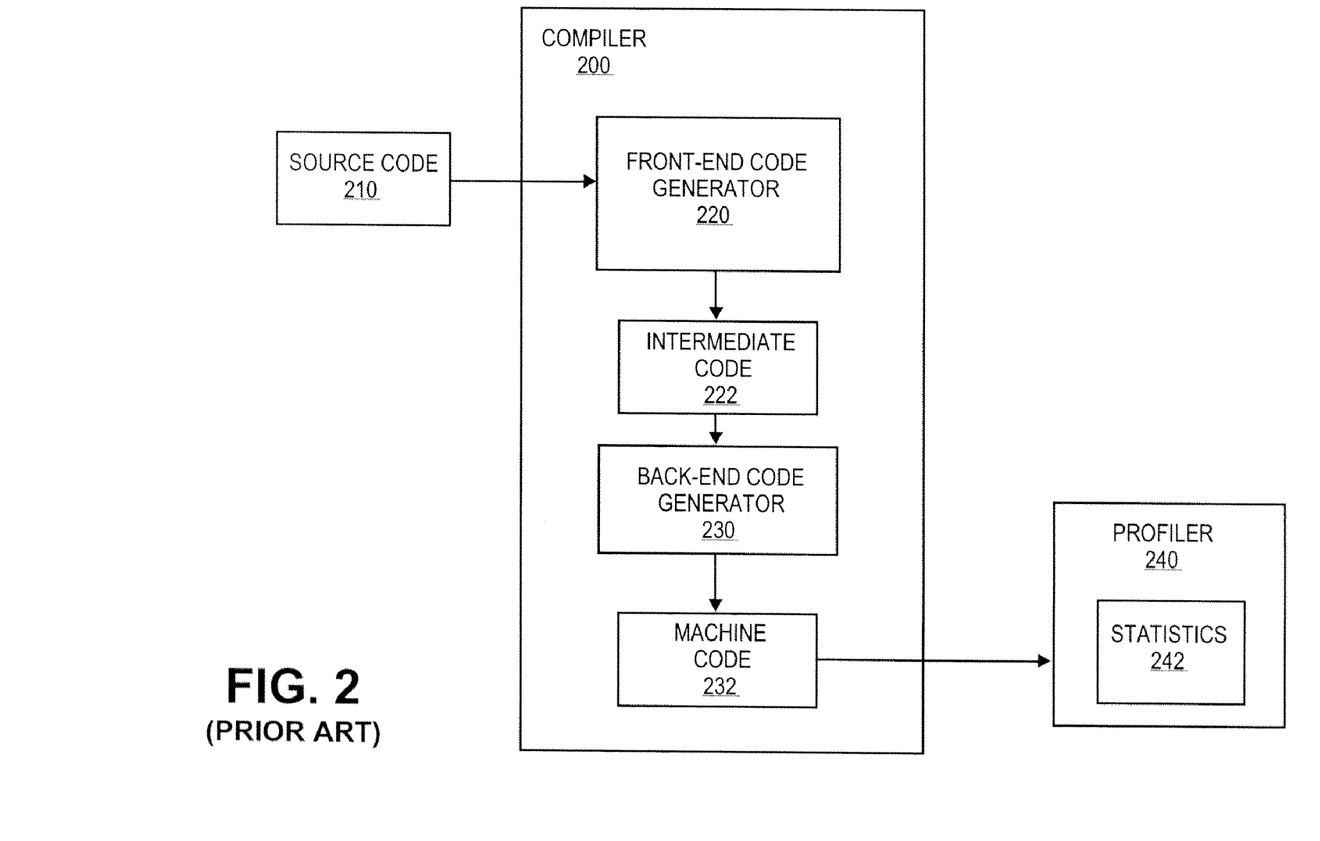
FIG. 2 is a block diagram illustrating a conventional compiler.

FIG. 2 is a block diagram illustrating a conventional compiler. Compiler 200 includes front-end code generator 220 and back-end code generator 230. Source code 210 is provided to front-end code generator 220 via, for example, data storage device 150, alphanumeric input device 170 or a network via network interface 180. Front-end code generator 220 transforms source code 210 into intermediate code 222, and back-end code generator 230 transforms intermediate code 222 into machine code 232.

While machine code 232 is running on electronic system 100, profiler 240 collects and records samples of machine code 232 at user-defined intervals, for example, once every millisecond. Once collection is complete, profiler 240 records statistics 242 corresponding to each section of machine code 232 sampled, where statistics 242 indicate, for example, the amount of time a section of machine code 232 takes to execute. As described previously, a programmer can use statistics 242 to identify hotspots in machine code 232 and rewrite source code 210.

FIG. 3 is a block diagram illustrating an example embodiment of a compiler and a profiler. As explained in more detail below, front-end code generator 320 receives source code 310 and generates intermediate code 322. Front-end code generator 320 receives source code 310 via, for example, data storage device 150, alphanumeric input device 170 or a network via network interface 180. Source code 310 may be written in any programming language known in the art, including for example, but not limited to, C, C++, Pascal and Java™.

Figure 3A:
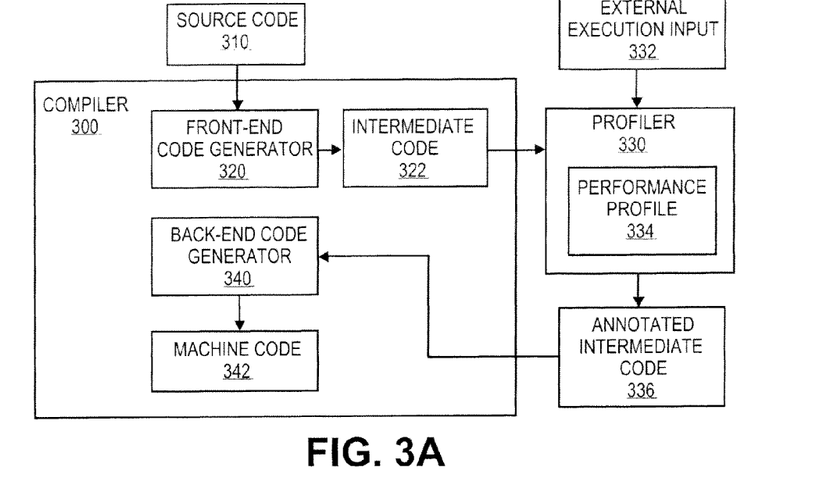
FIG. 3 is a block diagram illustrating an example embodiment of a compiler and a profiler.

As explained in more detail below, profiler 330 in FIG. 3(a) receives intermediate code 322 and external execution input 332. For example, and not for purposes of limitation, if source code 310 is a program for processing data packets in a network, external execution input 332 may be a stream of data packets to process during execution of intermediate code 322. Using external execution input 332, profiler 330 executes intermediate code 322 and generates performance profile 334, which is used to generate annotated intermediate code 336. Compiler 300 in FIG. 3(a) uses annotated intermediate code 336 to produce machine code 342.

Performance profile 334 may include data such as, but is not limited to, branch statistics, e.g., the number of times a branch is taken and not taken, in which case intermediate code 322 may be annotated or constructed in such a manner that a processor, whose selection algorithm is known, in the absence of other information selects by default the branch more often taken, thereby reducing the number of incorrect branch predictions. Performance profile 334 may also include, but is not limited to, loop statistics, e.g., the minimum, maximum and average number of times a loop is taken, in which case intermediate code 322 may be annotated to indicate when, and how many times to unroll a loop (e.g., extract the body of the loop and duplicate it, thereby avoiding branches and possibly intermixing operations in two iterations of the loop). Another example of information that may be included in performance profile 334 is function invocation statistics, e.g., the number of times functions are invoked from other functions, in which case intermediate code 322 may be annotated to indicate an in-lined function (e.g., a function placed directly at the call site of the function).

Figure 3B:
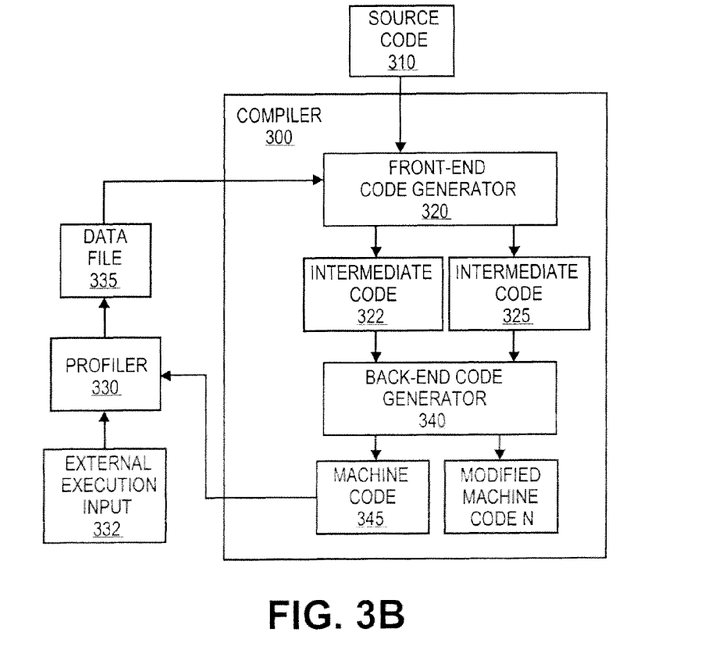

As explained in more detail below, profiler 330 in FIG. 3(b) receives machine code 345 and external execution input 332, and executes machine code 345 using external execution input 332. Profiler 330 observes the execution of machine code 345, and measures and records instances of when program execution is compromised, such as by a pipeline flush. The recorded data is used to generate data file 335. Compiler 300 in FIG. 3(b) uses data file 335 to produce modified machine code N, where N is any number of times machine code is generated based on successive iterations of data file 335.

The data in data file 335 may be a statistical summary of the outcome of each individual programming construction, such as a branch. Data file 335 may include data such as, but not limited to, branch statistics, e.g., the number of times a branch is taken and not taken. In that case a processor, whose selection algorithm is known, that executes modified machine code N selects by default the branch more often taken, thereby reducing the number of incorrect branch predictions in modified machine code N relative to machine code 345. Data file 335 may also include, but is not limited to, loop statistics, e.g., the minimum, maximum and average number of times a loop is taken, in which case the loop in machine code 345 is unrolled in modified machine code N. Another example of information that may be included in data file 335 is function invocation statistics, e.g., the number of times functions are invoked from other functions, in which case modified machine code N may include an in-lined function that was not present in machine code 345.

Performance profile 334 and data file 335 may be in a variety of formats, including, but not limited to a plain-text format, binary representations, database maps, and character delimited proprietary formats. Performance profile 334 and data file 335 may include a result of executing an instruction in machine code, and an identifier that associates the instruction executed with the result generated. Performance profile 334 and data file 335 may further include a result and an identifier for each attribute of machine code, for example, each branch and/or each loop. For example, performance profile 334 and data file 335 may indicate that a particular branch is the correct branch based on a percentage of times taken versus another branch. Back-end code generator 340 may thus transform intermediate code into machine code so that it predicts the correct branch. Performance profile 334 and data file 335 may, for example, indicate a number of times a loop executes, and based on that number, back-end code generator 340 may transform intermediate code into machine code in which that loop is unrolled.

For purposes of illustration and ease of explanation, embodiments of the invention refer to machine code to describe executable code. However, embodiments of the invention apply generally to generating a form of code that is accessible to an electronic system and executable by an electronic system.

Unlike a conventional profiler, which is able to sample a program only after it has been converted to machine code, profiler 330 is able to execute intermediate code and modify the program based on the execution of the intermediate code, prior to conversion of the program to machine code. Moreover, unlike a conventional compiler, compiler 300 is able to receive annotated intermediate code and generate machine code from the annotated intermediate code. Furthermore, compiler 300 is able to receive a data file that includes statistics generated based on execution of the machine code, use the data file, along with the original source code for the program, to modify the original program, and repeat the process for a number of cycles based on user-defined criteria.

Consequently, an electronic system can automatically modify a program, thereby reducing the amount of time and resources used to modify the program, rather than having a programmer analyze profiler-generated data, then manually inspect and rewrite the program. The modified program performs better, for example, executes faster, than a program generated by a conventional compiler. Compiler 300 and/or profiler 330 may be implemented in software, hardware, or a combination thereof.

In one embodiment, profiler 330 includes a virtual machine (not shown) or other simulated hardware (not shown). A virtual machine is an electronic system implemented in software that exists within electronic system 100. The virtual machine shares the resources of electronic system 100, but operates as if it is a separate electronic system. Virtual machines are known in the art, and thus will not be described further except in the context of embodiments of the invention.

In another embodiment, profiler 330 includes probed hardware (not shown). In general, probed hardware is a component of electronic system 100, for example, a circuit board, semiconductor or other logic device that executes machine code, where the results of executing various instructions are monitored and recorded. Probed hardware is known in the art, and thus will not be described further except in the context of embodiments of the invention.

In one embodiment, profiler 330 is located on the same electronic system as compiler 300. In another embodiment, profiler 330 is located on a different electronic system than compiler 300. In that case, data generated by compiler 300 that is used by profiler 330 is provided to profiler 330 via, for example, data storage device 150 or over a network via network interface 180.

Although in one embodiment profiler 330 generates performance profile 334 and data file 335, in another embodiment, one profiler generates performance profile 334, while another profiler generates data file 335. Both profilers may be located on the same electronic system as compiler 300. Alternatively, one profiler may be located on the same electronic system as compiler 300, while the other profiler is located on a different electronic system than compiler 300, in which case data generated by compiler 300 is received by the single profiler via, for example, data storage device 150 or over a network via network interface 180. Both profilers may include a virtual machine (or other simulated hardware). Alternatively, one profiler may include a virtual machine (or other simulated hardware), and the other profiler may include probed hardware.

Figure 4:
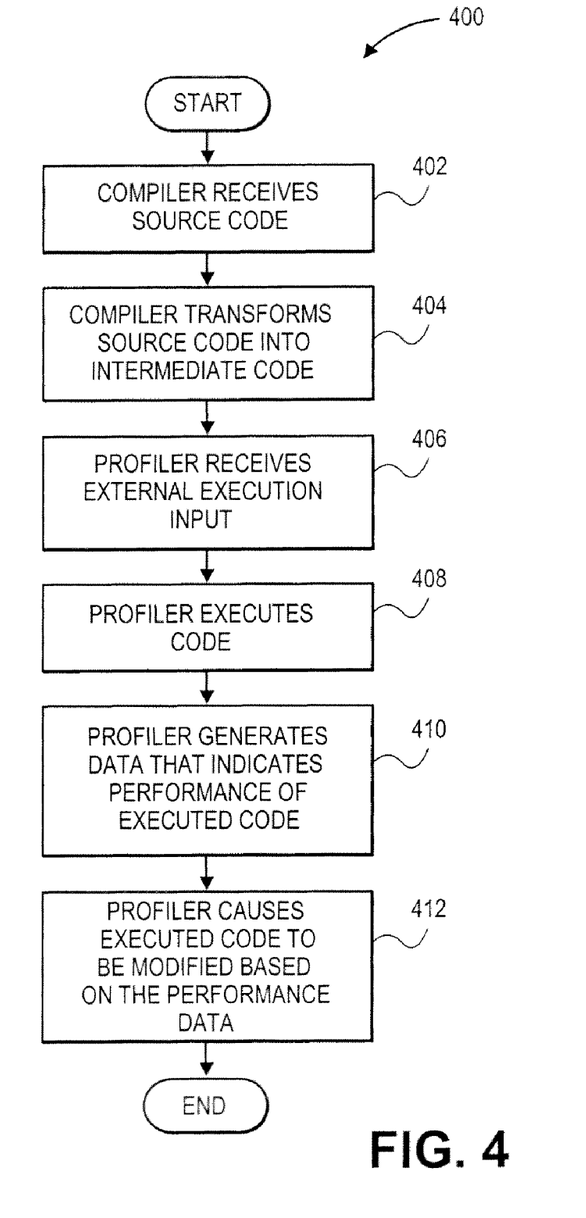
FIG. 4 is a flow chart illustrating an example embodiment of generating machine code.

FIG. 4 is a flow chart illustrating an example embodiment of generating machine code. At 402 of method 400, front-end code generator 320 receives source code 310. At 404, front-end code generator 320 transforms source code 310 into intermediate code 322. At 406, profiler 330 receives external execution input 332. Profiler 330 may receive external execution input 332 in any manner, including, but not limited to, via data storage device 150, via alphanumeric input device 170 or from a network via network interface 180.

At 408, profiler 330 executes code using external execution input 332. Although FIG. 4 is described in terms of receiving external execution input 332 to execute code, profiler 330 may execute code without receiving external execution input 332. In one embodiment, profiler 330 executes intermediate code 322. In another embodiment, back-end code generator 340 transforms intermediate code 322 into machine code 342, and profiler 330 executes machine code 345. As used herein, execution of code includes actual execution of code and simulated execution of code.

At 410, profiler 330 generates data that indicates the performance of the executed code. In one embodiment, profiler 330 generates performance profile 334 regarding the performance of intermediate code 322. In another embodiment, profiler 330 generates data file 335 regarding the performance of machine code 345.

At 412, profiler 330 causes the executed code to be modified based on the performance data. In one embodiment, profiler 330 provides data file 335 to compiler 300, which also receives source code 310, and compiler 300 transforms source code 310 into modified machine code N based on data file 335. Compiler 300 may receive data file 335 directly or indirectly from profiler 330 in any manner, including, but not limited to, via data storage device 150, via alphanumeric input device 170, from a network via network interface 180, via a shared permanent or temporary data storage location that is accessible to profiler 330 and compiler 300, and via a direct real-time connection between profiler 330 and compiler 300, such that profiler 330 may pass data back to compiler 300 as compiler 300 is generating modified machine code N for profiler 330 to measure. Transforming source code 310 into modified machine code N is described in more detail in FIG. 5.

In another embodiment, profiler 330 causes executed code to be modified based on performance data by annotating intermediate code 322 based on performance profile 334, to generate annotated intermediate code 336, and providing annotated intermediate code 336 to compiler 300. Profiler 330 may annotate intermediate code 322 by concatenating data structures that include performance statistics, for example, loop iteration counts, branches taken and not taken counts, etc., to intermediate code 322, thereby embedding data from performance profile 334 directly into intermediate code 322. Alternatively, profiler 330 may annotate intermediate code 322 by generating a separate file that includes the data from performance profile 334 and a mapping of the data to the applicable portion of intermediate code 322. At compiler 300, back-end code generator 340 transforms annotated intermediate code 336 into machine code 342.

Figure 5:
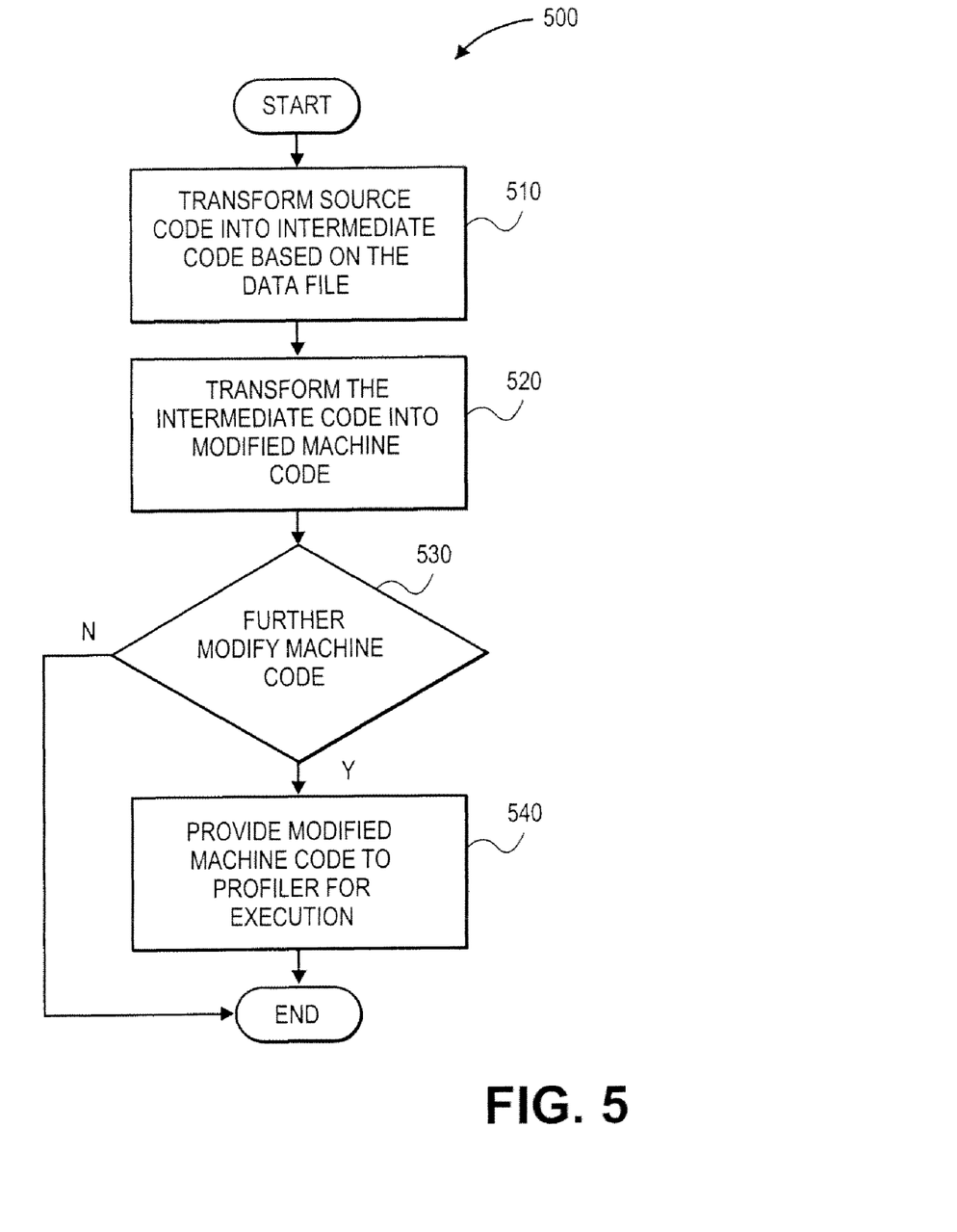
FIG. 5 is a flow chart illustrating an example embodiment of transforming source code into machine code based on a data file.

FIG. 5 is a flow chart illustrating an example embodiment of transforming source code 310 into modified machine code N based on data file 335. At 510 of method 500, front-end code generator 320 transforms source code 310 into intermediate code 325 based on data file 335. At 520, back-end code generator 340 transforms intermediate code 325 into modified machine code N.

At 530, compiler 300 determines whether to further modify modified machine code N. In one embodiment, compiler 300 makes this determination based on whether compiler 300 has achieved a predetermined user-defined performance gain, for example, a percentage of performance improvement in terms of whether modified machine code N executes faster than machine code 345 or machine code N−1, as applicable. In another embodiment, compiler 300 makes this determination based on the amount of time needed to generate modified machine code N. Specifically, if the amount of time exceeds a user-defined period of time, compiler 300 does not to attempt further modification of source code 310.

In another embodiment, compiler 300 makes this determination based on the cost of an iteration of the process relative to the performance gain achieved as a result of the iteration. For example, it is likely that the performance gains will diminish in magnitude with each iteration of modified machine code N, and that eventually the gains will be negligible although the effort to perform each iteration will be the same as the first and subsequent iterations. In that case, compiler 300 may determine not to continue to modify machine code N, because the gains per iteration are not beneficial in terms of, for example, time, expense, or some other metric.

If compiler 300 does not further modify source code 310, method 500 ends. However, if compiler 300 further modifies source code 310, at 540 compiler 300 provides modified machine code N to profiler 330 for execution.

Thus, compiler 300 generates intermediate code 325 that takes into account the data included in data file 335. However, rather than compiler 300 simply transforming intermediate code 325 into modified machine code N, profiler 330 may, as described previously, execute intermediate code 325 to generate a performance profile that is used to annotate intermediate code 325. Compiler 300 may thus transform an annotated version of intermediate code 325 into modified machine code N.

FIG. 4 and FIG. 5 describe example embodiments of the invention in terms of a method. However, one should also understand it to represent a machine-accessible medium having recorded, encoded or otherwise represented thereon instructions, routines, operations, control codes, or the like, that when executed by or otherwise utilized by an electronic system, cause the electronic system to perform the methods as described above or other embodiments thereof that are within the scope of this disclosure.

FIG. 6 is a block diagram illustrating an example of a processing device. Processing device 120 includes local bus 605 to which various functional units are coupled. Local bus 605 is intended to represent a collection of one or more on-chip buses that interconnect various functional units of processing device 120. Representation of local buses as a single local bus 605 is provided for ease of understanding, and it should be understood that processing device 120 is not so limited. Those of ordinary skill in the art will appreciate that processing device 120 may have any suitable bus architecture and may include any number and combination of buses.

Core 610 and a number of processing engines 620 (e.g., processing engines 620a, 620b, . . . , 620k) are coupled with local bus 605. In one embodiment, core 610 comprises a general purpose processing system, which may execute an operating system. Core 610 may also control operation of processing device 120 and perform a variety of management functions, such as dispensing instructions to processing engines 620 for execution. Each of the processing engines 620a-k comprises any suitable processing system, and each may include an arithmetic and logic unit (ALU), a controller, and a number of registers (for storing data during read/write operations). Also, in one embodiment, each processing engine 620a-k provides for multiple threads of execution.

Also coupled with local bus 605 is an on-chip memory subsystem 630. Although depicted as a single unit, it should be understood that on-chip memory subsystem 630 may comprise a number of distinct memory units and/or memory types. For example, such on-chip memory may include SDRAM (synchronous dynamic random access memory), SRAM (static random access memory), and/or flash memory (e.g., Flash ROM). It should be understood that, in addition to on-chip memory, processing device 120 may be coupled with off-chip memory (e.g., ROM, off-chip cache memory, etc.).

Processing device 120 further includes bus interface 640 coupled with local bus 605. Bus interface 640 provides an interface with other components of computer system 100, including bus 110. For simplicity, bus interface 640 is depicted as a single functional unit; however, it should be understood that, in practice, processing device 120 may include multiple bus interfaces. For example, processing device 120 may include a PCI bus interface, an IX (Internet Exchange) bus interface, as well as others, and bus interface 640 is intended to represent a collection of one or more such interfaces.

It should be understood that the embodiment of processing device 120 illustrated and described with respect to FIG. 6 is but one example of a processing device, and that processing device 120 may have other components in addition to those shown in FIG. 6, which components have been omitted for clarity and ease of understanding. For example, processing device 120 may include other functional units (e.g., an instruction decoder unit, an address translation unit, etc.), a thermal management system, clock circuitry, additional memory, and registers. Also, it should be understood that a processing device may not include all of the elements shown in FIG. 6.

Reference in the foregoing specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific embodiments thereof. It will, however, be evident that various modifications and changes can be made thereto without departing from the broader spirit and scope of the embodiments of the invention. The specification and drawings are, accordingly, are to be regarded in an illustrative rather than a restrictive sense.

What is claimed is:

1. A method comprising:
receiving source code;
transforming the source code to intermediate code;
executing the intermediate code based on external execution input;
generating performance profile data that indicates performance of the intermediate code when the intermediate code is executed with the external execution input;
annotating the intermediate code based, at least in part, on the performance profile data to generate annotated intermediate code, wherein the annotating occurs after the executing of the intermediate code; and
producing machine code with a compiler based on the annotated intermediate code.

2. The method of claim 1, wherein executing the intermediate code comprises simulating execution of the intermediate code.

3. The method of claim 1, wherein annotating the intermediate code comprises concatenating data structures that include the performance profile data to intermediate code to embed the performance profile data into the intermediate code.

4. The method of claim 1, wherein annotating the intermediate code comprises:
generating a file that includes the performance profile data; and
mapping the performance profile data to corresponding portions of the intermediate code.

5. The method of claim 1, wherein the performance profile data comprises one or more of branch statistics, loop statistics or function invocation statistics.

6. The method of claim 1, wherein the machine code executes faster than the intermediate code.

7. The method of claim 1, further comprising:
receiving the external execution input; and
using the external execution input to execute the intermediate code.

8. The method of claim 1, wherein the data comprises o ne or more of plain-text format, binary representations, database maps, and character delimited proprietary format.

9. An article of manufacture comprising:
a computer readable storage medium including thereon sequences of instructions that, when executed, cause an electronic system to:
receive source code;
produce intermediate code based on the source code;
execute the intermediate code based on external execution input;
generate performance profile data that indicates performance of the intermediate code when the intermediate code is executed with the external execution input;
annotate the intermediate code based, at least in part, on the performance profile data to generate annotated intermediate code, wherein the annotating occurs after the executing of the intermediate code; and
produce machine code based on the annotated intermediate code using a compiler.

10. The article of manufacture of claim 9, wherein the sequences of instructions that, when executed, cause the electronic system to generate the data regarding the performance of the executed code comprise sequences of instructions that, when executed, cause the electronic system to generate a performance profile.

11. A system comprising:
a processor;
a dynamic random access memory coupled with the processor; and
an article of manufacture comprising a computer readable storage medium including thereon sequences of instructions that, when executed, cause an electronic system to:
receive source code;
produce intermediate code based on the source code;
execute the intermediate code based on external execution input;
generate performance profile data that indicates performance of the intermediate code when the intermediate code is executed with the external execution input;
annotating the intermediate code based, at least in part, on the performance profile data to generate annotated intermediate code, wherein the annotating occurs after the executing of the intermediate code; and
produce machine code based on the annotated intermediate code using a compiler.

12. The system of claim 11, wherein the computer readable storage medium further comprises sequences of instructions that, when executed, cause the electronic system to:
receive external execution input; and
use the external execution input to execute the intermediate code.

* * * * *